United States Patent
Ishikawa

(10) Patent No.: US 12,297,912 B2
(45) Date of Patent: May 13, 2025

(54) FLOW RATE CONTROL VALVE

(71) Applicant: TOYOTA JIDOSHA KABUSHIKI KAISHA, Toyota (JP)

(72) Inventor: Masami Ishikawa, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/458,320

(22) Filed: Aug. 30, 2023

(65) Prior Publication Data

US 2024/0125392 A1 Apr. 18, 2024

(30) Foreign Application Priority Data

Oct. 13, 2022 (JP) ................................. 2022-164876

(51) Int. Cl.
*F16K 1/38* (2006.01)
*F01M 13/00* (2006.01)
*F16K 27/02* (2006.01)

(52) U.S. Cl.
CPC ........... *F16K 1/38* (2013.01); *F01M 13/0011* (2013.01); *F16K 27/0254* (2013.01)

(58) Field of Classification Search
CPC .... F16K 27/0254; F16K 1/38; F01M 13/0011
See application file for complete search history.

(56) References Cited

U.S. PATENT DOCUMENTS

| 4,056,085 A * | 11/1977 | Nowroski | F01M 13/023 |
| | | | 123/574 |
| 5,697,351 A * | 12/1997 | Schumacher | F01M 13/023 |
| | | | 123/574 |
| 2010/0192925 A1* | 8/2010 | Sadakane | F02M 35/10216 |
| | | | 123/90.15 |
| 2020/0040782 A1* | 2/2020 | Dunn | F01M 13/0416 |

FOREIGN PATENT DOCUMENTS

| JP | 2012-246908 A | 12/2012 |
| JP | 2013-155691 A | 8/2013 |

* cited by examiner

*Primary Examiner* — Kevin A Lathers
(74) *Attorney, Agent, or Firm* — Oblon, McClelland, Maier & Neustadt, L.L.P.

(57) ABSTRACT

A flow rate control valve is configured to adjust a flow rate of blow-by gas drawn into an intake passage from a crankcase of an internal combustion engine that uses hydrogen as fuel. The flow rate control valve includes a flow rate adjuster having a valve member. The flow rate adjuster has a cross-sectional flow area in a section through which the blow-by gas passes. The cross-sectional flow area is changed in accordance with movement of the valve member. The flow rate control valve is configured such that the cross-sectional flow area is maximized when a load on the internal combustion engine is less than or equal to that in an idling operation state.

5 Claims, 3 Drawing Sheets

FLOW RATE CONTROL VALVE

BACKGROUND

1. Field

The present disclosure relates to a flow rate control valve.

2. Description of Related Art

A blow-by gas treating device for an internal combustion engine includes a positive crankcase ventilation (PCV) valve, which is a flow rate control valve and adjusts the flow rate of blow-by gas drawn into an intake passage from a crankcase. For example, refer to Japanese Laid-Open Patent Publication No. 2012-246908.

In an internal combustion engine that uses hydrogen as fuel, hydrogen gas accumulates in the crankcase. Thus, during maintenance of the engine, hydrogen gas may leak from the crankcase. Before performing maintenance, the internal combustion engine is often in an idling operation state. Therefore, the hydrogen concentration in the crankcase is preferably lowered during an idling operation state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a flow rate control valve is configured to adjust a flow rate of blow-by gas drawn into an intake passage from a crankcase of an internal combustion engine that uses hydrogen as fuel. The flow rate control valve includes a flow rate adjuster that includes a valve member. The flow rate adjuster has a cross-sectional flow area in a section through which the blow-by gas passes and is configured to change the cross-sectional flow area in accordance with movement of the valve member. The flow rate control valve is configured such that the cross-sectional flow area is maximized when a load on the internal combustion engine is less than or equal to that in an idling operation state.

With this configuration, the amount of blow-by gas drawn into the intake passage from the crankcase is maximized when the load on the internal combustion engine is less than or equal to that in an idling operation state. Therefore, the hydrogen concentration in the crankcase is lowered during an idling operation state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A flow rate control valve according to one embodiment will now be described. The flow rate control valve is provided in a blow-by gas treating device of an internal combustion engine 10.

Configuration of Internal Combustion Engine

Figure 1:
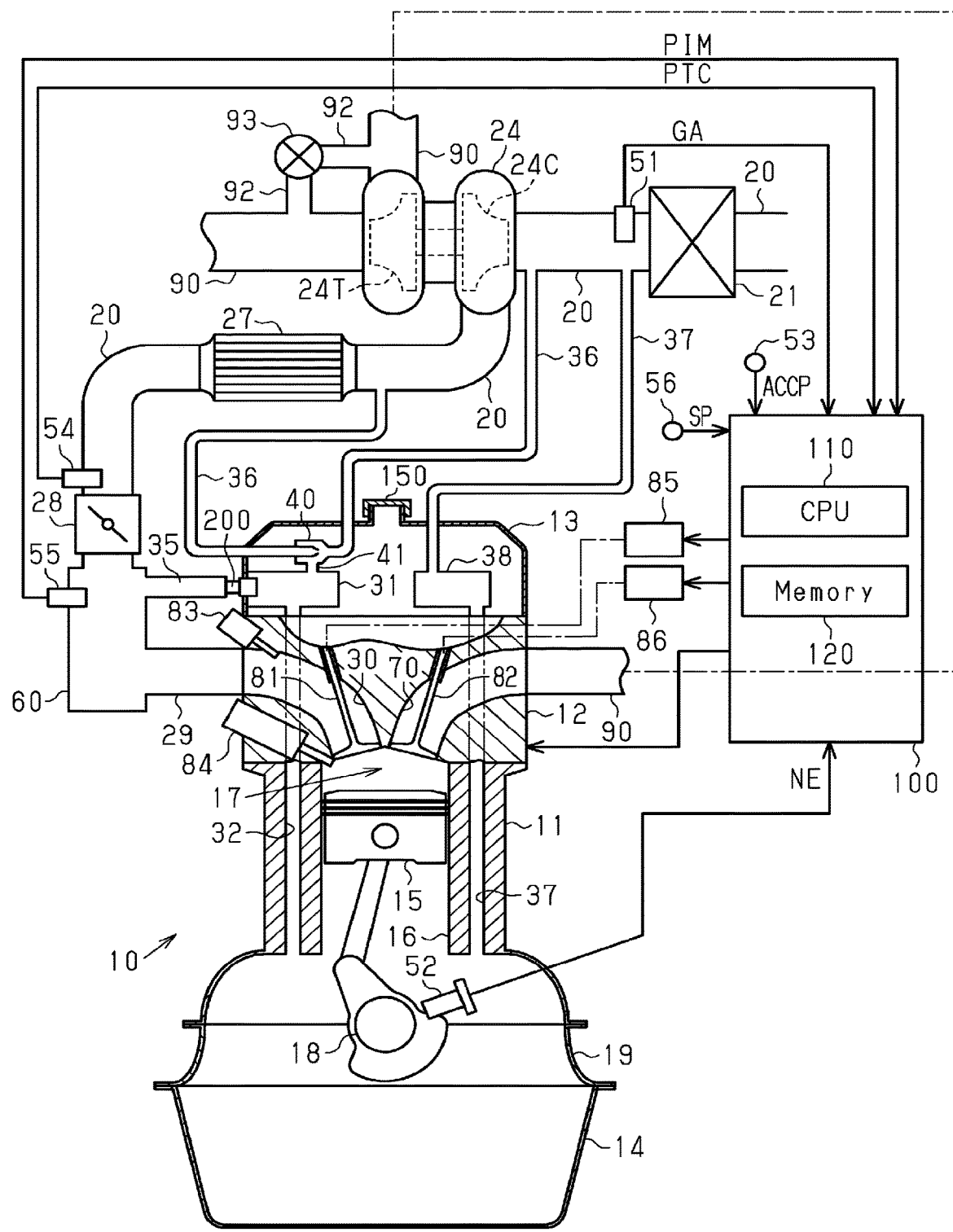
FIG. 1 is a schematic diagram showing the configuration of an internal combustion engine according to one embodiment.

As shown in FIG. 1, the internal combustion engine 10 includes a cylinder block 11, a cylinder head 12, a head cover 13, and an oil pan 14. An oil filler cap 150 is detachably provided in an upper portion of the head cover 13. The oil filler cap 150 is opened when replenishing the oil pan 14 of the internal combustion engine 10 with oil.

The cylinder block 11 includes a cylinder 16, in which a piston 15 is disposed to reciprocate.

The cylinder head 12 includes an intake port 30, which conducts intake air into a combustion chamber 17 of the internal combustion engine 10, and an exhaust port 70, which discharges exhaust gas from the combustion chamber 17. The intake port 30 is provided with an intake valve 81. The drive system of the intake valve 81 is provided with an intake-side variable valve timing mechanism 85, which is a variable valve actuation mechanism that changes valve timing (opening/closing timing) of the intake valve 81. The exhaust port 70 is provided with an exhaust valve 82. The drive system of the exhaust valve 82 is provided with an exhaust-side variable valve timing mechanism 86, which is a variable valve actuation mechanism that changes valve timing (opening/closing timing) of the exhaust valve 82.

The cylinder head 12 also includes a port injection valve 83, which injects hydrogen as fuel into the intake port 30, a direct injection valve 84, which directly injects hydrogen as fuel into the combustion chamber 17, and an ignition plug (not shown).

A crankcase 19 is provided below the cylinder block 11. The crankcase 19 accommodates a crankshaft 18, which is an output shaft of the internal combustion engine 10. The oil pan 14, which stores lubricant, is provided below the crankcase 19.

An intake manifold 29, which includes a surge tank 60, is connected to the upstream side of the intake port 30. An intake pipe 20 is connected to the upstream side of the surge tank 60. The intake pipe 20, the surge tank 60, and the intake manifold 29 form an intake passage of the internal combustion engine 10.

The intake pipe 20 includes, in order from the upstream end, an air cleaner 21, an air flow meter 51, a compressor wheel 24C of a forced-induction device 24, an intercooler 27, a boost pressure sensor 54, and a throttle valve 28. The forced-induction device 24 is driven by the exhaust gas discharged from the combustion chambers 17. The surge tank 60 is provided with an intake pressure sensor 55. The opening degree of the throttle valve 28 is changed by an electric motor.

The air cleaner 21 filters intake air taken into the intake pipe 20. The forced-induction device 24 compresses air in the intake pipe 20. The intercooler 27 cools the air that has passed through the compressor wheel 24C. The throttle valve 28 adjusts the intake air amount by controlling the valve opening degree.

The air flow meter 51 detects an intake air amount GA. The boost pressure sensor 54 detects a boost pressure PTC at a downstream side of the compressor wheel 24C in the intake pipe 20. The intake pressure sensor 55 detects an intake pressure PIM, which is the pressure in the surge tank 60.

An exhaust passage 90 is connected to the downstream side of the exhaust port 70. A housing that accommodates a turbine wheel 24T of the forced-induction device 24 is connected to an intermediate portion of the exhaust passage 90. A section of the exhaust passage 90 on the upstream side of the turbine wheel 24T is connected to a section on the downstream side of the turbine wheel 24T via a bypass passage 92. A wastegate valve (hereinafter, referred to as WGV) 93 is provided in the bypass passage 92. The opening degree of the WGV 93 is adjusted by an actuator. The WGV 93 regulates the amount of exhaust gas flowing through the bypass passage 92. An increase in the opening degree of the WGV 93 increases the amount of exhaust gas that passes through the bypass passage 92 while bypassing the turbine wheel 24T. As a result, the boost pressure of the intake air, which is increased by the forced-induction device 24, decreases.

The internal combustion engine 10 is provided with a blow-by gas treating device, which treats gas leaking from the combustion chamber 17 into the crankcase 19 during a compression stroke and/or a combustion stroke, that is, so-called blow-by gas. The blow-by gas treating device includes a suction passage 32 configured to conduct the blow-by gas in the crankcase 19 to a main separator 31, which is an oil separator installed in the head cover 13. The end of the suction passage 32 connected to the main separator 31 opens in the crankcase 19.

The main separator 31 is connected to the surge tank 60 via a PCV valve 200 and a PCV passage 35.

The PCV valve 200 is a flow rate control valve that adjusts the flow rate of the blow-by gas drawn into the intake passage from the crankcase 19. The PCV valve 200 opens when the pressure in the surge tank 60 becomes lower than the pressure in the main separator 31, which is the pressure in the crankcase 19, thereby allowing the blow-by gas to flow from the main separator 31 to the surge tank 60. The suction passage 32, the main separator 31, the PCV valve 200, and the PCV passage 35 form a coupling passage hat connects the surge tank 60, which forms part of the intake passage, to the crankcase 19.

For example, when the boost pressure of the forced-induction device 24 is relatively low, the pressure in the surge tank 60 is lower than the pressure in the main separator 31. Accordingly, the blow-by gas in the crankcase 19 is drawn into the surge tank 60 via the suction passage 32, the main separator 31, the PCV valve 200, and the PCV passage 35. The drawn-in blow-by gas is delivered to the combustion chamber 17 together with the intake air and burned therein.

An ejector 40 is connected to the main separator 31 via a connection passage 41. The ejector 40 is provided in a bypass passage 36 that connects a section of the intake pipe 20 on the upstream side of the compressor wheel 24C to a section of the intake pipe 20 on the downstream side of the compressor wheel 24C. The ejector 40 includes a constriction for generating a negative pressure by the Venturi effect.

The blow-by gas treating device is provided with an atmosphere introducing passage 37 for drawing in intake air into the crankcase 19 for scavenging. One of the opposite ends of the atmosphere introducing passage 37 is connected to a section of the intake pipe 20 between the air cleaner 21 and the compressor wheel 24C. The atmosphere introducing passage 37 extends through the head cover 13, passes through the inside of the cylinder head 12 and the cylinder block 11, and is connected to the crankcase 19. An atmosphere-side separator 38, which is an oil separator installed in the head cover 13, is provided in the atmosphere introducing passage 37.

When the boost pressure of the forced-induction device 24 is relatively high, air flows through the bypass passage 36 from the downstream side to the upstream side of the compressor wheel 24C, so that a negative pressure is generated in the ejector 40. Due to the negative pressure generated in the ejector 40, the blow-by gas in the crankcase 19 is drawn into the ejector 40 through the suction passage 32, the main separator 31, and the connection passage 41. The blow-by gas drawn into the ejector 40 is conducted together with air into a section of the intake pipe 20 on the upstream side of the compressor wheel 24C via the bypass passage 36. The blow-by gas drawn into the intake pipe 20 is delivered to the combustion chamber 17 together with the intake air and burned therein.

Controller 100

A controller 100 controls the internal combustion engine 10. Specifically, the controller 100 operates various devices to be operated, such as the throttle valve 28, the port injection valve 83, the direct injection valve 84, the ignition plug, the intake-side variable valve timing mechanism 85, the exhaust-side variable valve timing mechanism 86, and the WGV 93.

The controller 100 includes electronic components such as a central processing unit (hereinafter, referred to as a CPU) 110 and a memory 120, which stores programs and data that are used in control operations. The controller 100 executes various types of control operations by causing the CPU 110 to execute programs stored in the memory 120.

The controller 100 receives detection signals from the air flow meter 51, the boost pressure sensor 54, and the intake pressure sensor 55. The controller 100 also receives detection signals from a crank angle sensor 52, which detects the rotational angle of the crankshaft 18 (crank angle), to calculate an engine rotation speed NE. The controller 100 also receives detection signals from, for example, an accelerator operation amount sensor 53 and a vehicle speed sensor 56. The accelerator operation amount sensor 53 detects an accelerator operation amount ACCP, which is an operation amount of an accelerator pedal. The vehicle speed sensor 56 detects a vehicle speed SP of a vehicle equipped with the internal combustion engine 10.

The controller 100 calculates an engine load factor KL based on the engine rotation speed NE and the intake air amount GA. The engine load factor KL is a parameter that determines the amount of air supplied to the combustion chamber 17, and is the ratio of the inflow air amount per combustion cycle in one cylinder to a reference inflow air amount. The reference inflow air amount may be varied in accordance with the engine rotation speed NE.

The controller 100 basically maintains the throttle valve 28 at an opening degree greater than or equal to a specified value, for example, at an opening degree close to the fully opened state. As the requested output of the internal combustion engine 10 increases, the amount of fuel injected from the port injection valve 83 and the direct injection valve 84 increases. As described above, the output of the internal combustion engine 10 is adjusted basically by changing the air-fuel ratio of the air-fuel mixture through adjustment of not the intake air amount but the fuel injection amount.

PCV Valve

Figure 2:
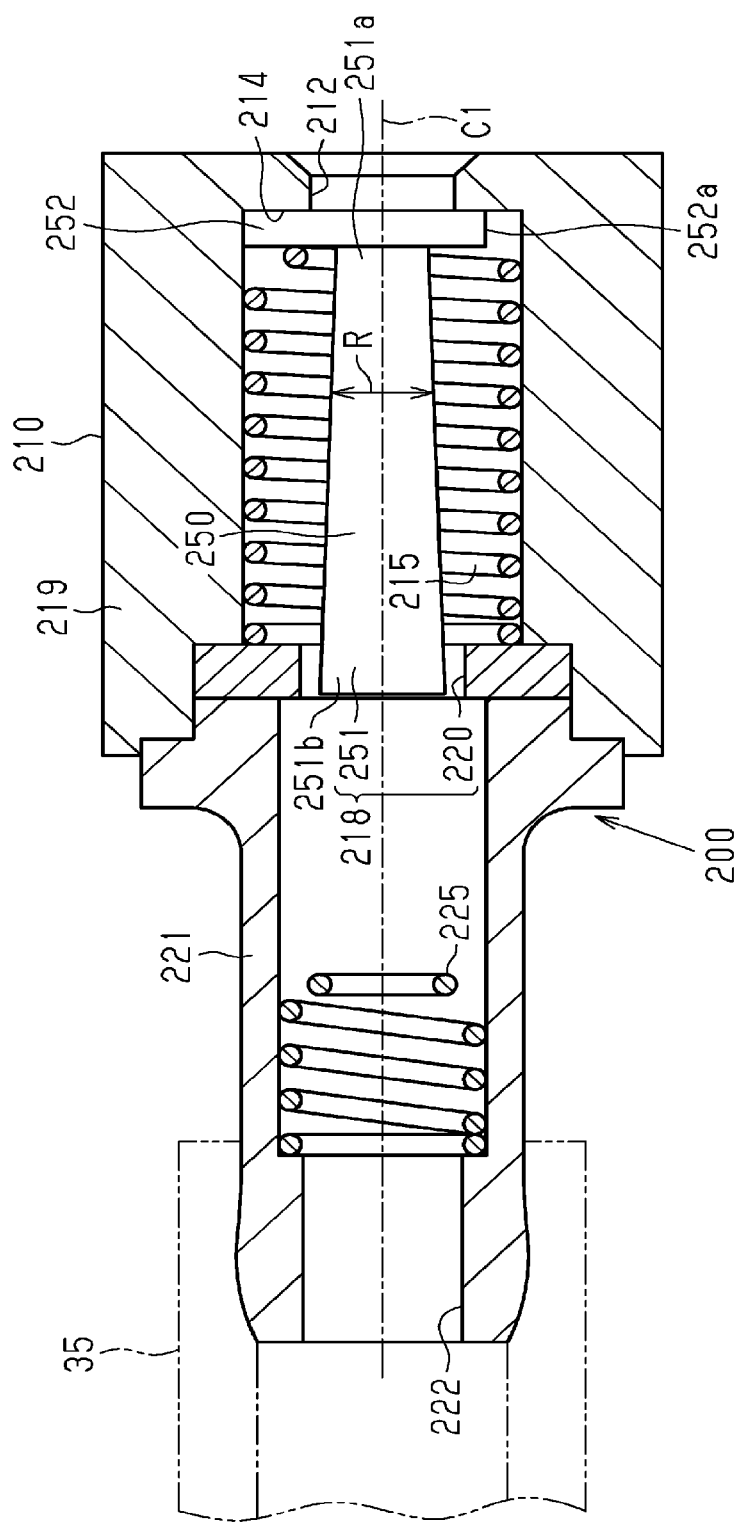
FIG. 2 is a cross-sectional view showing the structure of a PCV valve in the internal combustion engine shown in FIG. 1.

FIG. 2 is a cross-sectional view of the PCV valve 200. FIG. 2 shows the central axis of the PCV valve 200 as an axis Cl.

As shown in FIG. 2, the PCV valve 200 includes an inlet hole 212, through which blow-by gas is drawn in. The inlet hole 212 opens in the main separator 31 to be connected to the space in the crankcase 19. The central axis of the inlet hole 212 is coaxial with the axis Cl.

The PCV valve 200 includes an outlet hole 222, through which blow-by gas flows out. The outlet hole 222 is connected to the PCV passage 35 to be connected to the intake passage. The central axis of the outlet hole 222 is coaxial with the axis Cl.

The PCV valve 200 includes a housing 210, which is a combination of a first unit 219 and a second unit 221.

The first unit 219 accommodates a valve portion 250, which is movable in the extending direction of the axis Cl. The valve portion 250 includes a valve member 251 and a flange 252. The valve member 251 has a columnar shape extending in the extending direction of the axis Cl. The valve member 251 includes a first end 251a and a second end 251b, which is on a side opposite to the first end 251a. The first end 251a of the valve member 251 is closer to the inlet hole 212 than the second end 251b is. The second end 251b of the valve member 251 is closer to the outlet hole 222 than the first end 251a is. The flange 252 is provided at the first end 251a of the valve member 251. The flange 252 is disc-shaped and has a cutout 252a in a part of the outer circumference. The blow-by gas passes through the cutout 252a.

The valve member 251 has a tapered shape with a diameter increasing from the inlet hole 212 toward the outlet hole 222. The diameter R of the valve member 251 is the smallest at the first end 251a, which faces the inlet hole 212.

The first unit 219 includes a valve seat 214, on which the flange 252 of the valve portion 250 is seated. When the flange 252 is seated on the valve seat 214, the inlet hole 212 is closed.

The first unit 219 includes a first spring 215, which urges the valve portion 250 toward the valve seat 214. When a force greater than the urging force of the first spring 215 is generated, the flange 252 is separated from the valve seat 214, so that the inlet hole 212 is open.

The first unit 219 includes a flow rate adjuster 218. The flow rate adjuster 218 has a cross-sectional flow area in a section through which blow-by gas passes. The flow rate adjuster 218 is configured to change the cross-sectional flow area in accordance with movement of the valve member 251. The flow rate adjuster 218 includes a columnar valve member 251 and a circular and annular hole 220 through which the valve member 251 passes. When the tapered valve member 251 is moved in the extending direction of the axis Cl to passes through the hole 220, the cross-sectional flow area, which is the gap between the hole 220 and the valve member 251, is changed. The flow rate of the blow-by gas passing through the PCV valve 200 is adjusted by changing the cross-sectional flow area. The first end 251a is configured to move to the hole 220 when the load on the internal combustion engine 10 is less than or equal to that in an idling operation state.

The second unit 221 is attached to the end of the first unit 219 that is on the side opposite to the inlet hole 212. The second unit 221 includes a second spring 225, which restricts movement of the valve portion 250 toward the outlet hole 222.

Operation and Advantages

Operation and advantages of the present embodiment will now be described.

(1) The internal combustion engine 10 uses hydrogen as fuel. Thus, hydrogen gas contained in the blow-by gas is likely to accumulate in the crankcase 19. If hydrogen gas has accumulated in the crankcase 19, the hydrogen gas may leak into the engine compartment during maintenance of the internal combustion engine 10. For example, when the oil filler cap 150 is removed to supply oil, hydrogen gas leaks from the crankcase 19. Also, such leakage of hydrogen gas is likely to occur when the amount of oil stored in the oil pan 14 is checked with an oil level gauge or when the ignition plug is removed for inspection.

Before performing maintenance, the internal combustion engine 10 is often in an idling operation state. Therefore, if the hydrogen concentration in the crankcase 19 is lowered during an idling operation state, high concentration hydrogen gas is prevented from leaking from the crankcase 19 during maintenance.

In this regard, the inlet hole 212 of the above-described PCV valve 200 is connected to the space in the crankcase 19. The outlet hole 222 is connected to the intake passage. When the load on the internal combustion engine 10 is less than or equal to that in an idling operation state, the pressure in the surge tank 60, which forms part of the intake passage, is lowered. Thus, the valve member 251 is moved in a direction from the inlet hole 212 toward the outlet hole 222. When the load on the internal combustion engine 10 is less than or equal to that in an idling operation state, the first end 251a of the valve member 251, which faces the inlet hole 212, is moved to the position of the hole 220. In this configuration, the diameter R of the valve member 251 is the smallest at the first end 251a, which faces the inlet hole 212. Accordingly, the PCV valve 200 of the present embodiment is configured such that the cross-sectional flow area of the flow rate adjuster 218 is maximized when the load on the internal combustion engine 10 is less than or equal to that in an idling operation state. Thus, the amount of blow-by gas drawn into the intake passage from the crankcase 19 is maximized when the load on the internal combustion engine 10 is less than or equal to that in an idling operation state. This lowers the hydrogen concentration in the crankcase 19 in an idling operation state.

Figure 3:
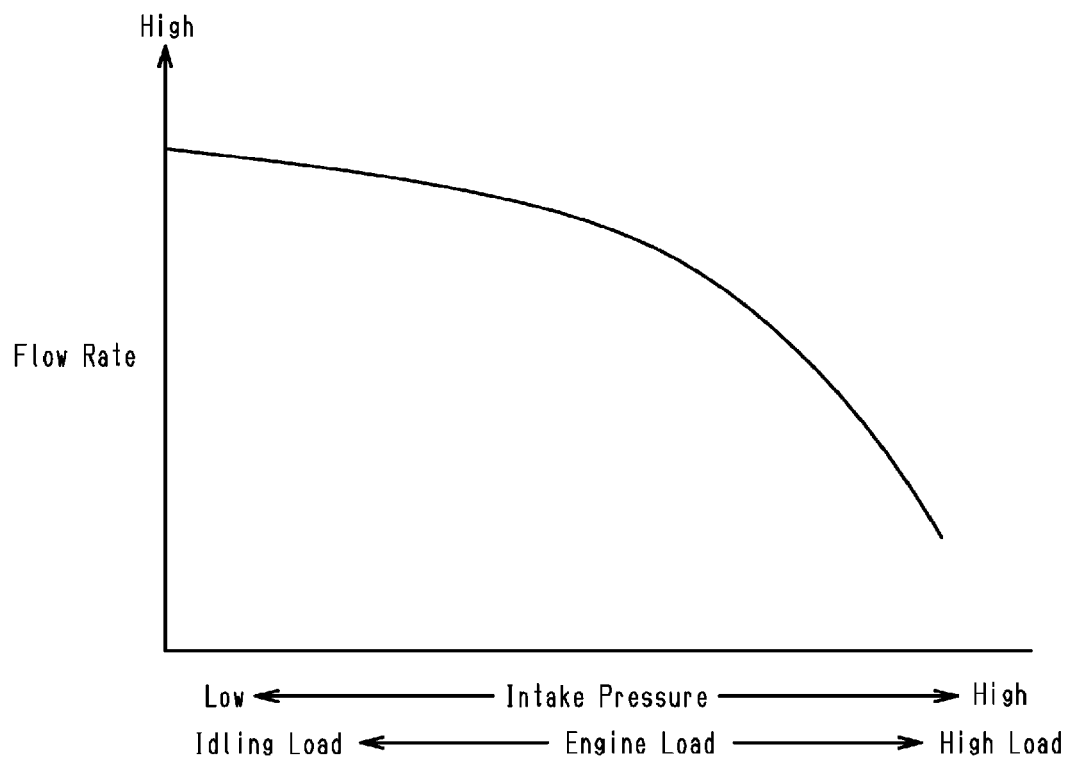
FIG. 3 is a graph showing the flow rate characteristics of the PCV valve shown in FIG. 2.

(2) As shown in FIG. 3, when the engine load in an idling operation state is referred to as idling load, the intake pressure PIM decreases as the engine load changes from a high engine load toward the idling load. As the intake pressure PIM decreases, the valve member 251 is moved in the direction from the inlet hole 212 toward the outlet hole 222. The valve member 251 is tapered such that its diameter increases from the inlet hole 212 toward the outlet hole 222. Thus, as the valve member 251 is moved, the cross-sectional flow area of the flow rate adjuster 218 increases continuously. As the cross-sectional flow area increases continuously, the flow rate of the blow-by gas passing through the PCV valve 200 increases continuously. Thus, the PCV valve 200 of the present embodiment allows the flow rate of blow-by gas to be changed smoothly.

(3) In an internal combustion engine that uses gasoline as fuel, if the amount of recirculated blow-by gas is increased when the engine load is low, the combustion of air-fuel mixture tends to be unstable. Thus, the amount of blow-by gas is reduced in an idling operation state. In contrast, since the combustion speed of hydrogen is relatively high, the combustion of hydrogen is unlikely to be unstable even if the amount of recirculated blow-by gas is increased. In the present embodiment, the above-described PCV valve 200 is used in the internal combustion engine 10, which uses hydrogen as fuel. The present embodiment thus provides a PCV valve that maximizes the cross-sectional flow area when the load on the internal combustion engine 10 is less than or equal to that in an idling operation state, while suppressing instability of combustion of air-fuel mixture.

Modifications

The above-described embodiment may be modified as follows. The above-described embodiment and the following modifications can be combined as long as the combined modifications remain technically consistent with each other.

Figure 4:
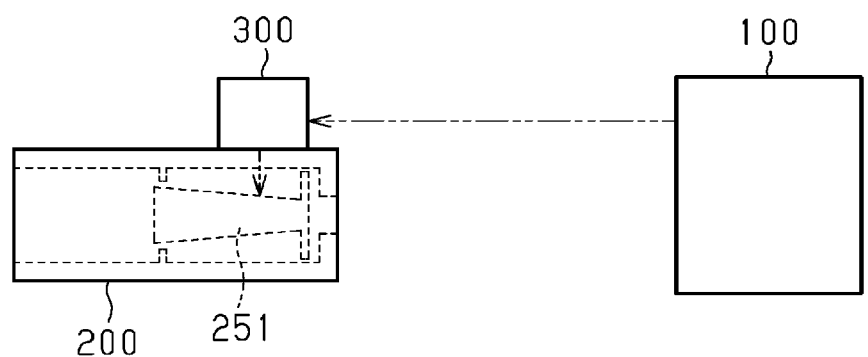
FIG. 4 is a schematic diagram showing a modification of the embodiment.

As shown in FIG. 4, the PCV valve 200 may be provided with an actuator 300 that moves the valve member 251. The controller 100 may control operation of the actuator 300 such that the cross-sectional flow area of the flow rate adjuster 218 is maximized when the load on the internal combustion engine 10 is less than or equal to that in an idling operation state. More specifically, when the load on the internal combustion engine 10 is less than or equal to that in an idling operation state, operation of the actuator 300 may be controlled such that the first end 251a of the valve member 251 is moved to the position of the hole 220. Whether the load on the internal combustion engine 10 is less than or equal to that in an idling operation state may be determined by the controller 100 based on parameters such as the engine load factor KL and the accelerator operation amount ACCP.

In this modification, the actuator 300 is configured to be controlled to operate such that the cross-sectional flow area is maximized when the load on the internal combustion engine 10 is less than or equal to that in an idling operation state. Thus, the amount of blow-by gas drawn into the intake passage from the crankcase 19 is maximized when the load on the internal combustion engine 10 is less than or equal to that in an idling operation state. This configuration also lowers the hydrogen concentration in the crankcase 19 during the idling operation state.

In this modification, the valve member 251 may be tapered such that the diameter of the valve member 251 decreases from the inlet hole 212 toward the outlet hole 222. That is, the diameter R of the valve member 251 may be minimized at the second end 251b, which faces the outlet hole 222. In this case, when the load on the internal combustion engine 10 is less than or equal to that in an idling operation state, the actuator 300 may be operated to move the second end 251b of the valve member 251, which faces the outlet hole 222, to the position of the hole 220.

Further, in this modification, the structure of the flow rate adjuster 218 may be different from that described above. For example, a ball valve may be used in which the cross-sectional flow area of the part through which blow-by gas passes is changed by driving an actuator. Even in this case, the same operation and advantages are achieved by driving the actuator such that the cross-sectional flow area of the part through which blow-by gas passes is maximized when the load on the internal combustion engine 10 is less than or equal to that in an idling operation state.

In the above-described embodiment, the first unit 219 and the second unit 221 are combined to constitute the housing 210 of the PCV valve 200. However, the housing 210 may be a component that has been molded integrally.

The valve member 251 may be shaped such that the diameter R changes in a stepwise manner. In this case also, the advantages except for advantage (2) are achieved.

Although the PCV passage 35 is connected to the surge tank 60, the PCV passage 35 may be connected to any section of the intake passage if that section is downstream of the throttle valve 28.

The internal combustion engine 10 may include only one of the port injection valve 83 and the direct injection valve 84.

The internal combustion engine 10 does not necessarily need to include the forced-induction device 24 or the ejector 40.

The internal combustion engine 10 does not necessarily need to include the intake-side variable valve timing mechanism 85 or the exhaust-side variable valve timing mechanism 86.

In a hybrid electric vehicle that includes an internal combustion engine and a motor as drive sources, the load on the internal combustion engine may be lower than that in an idling operation state even when combustion of air-fuel mixture is being performed. In such an operating state, the motor needs to generate assist torque. In a hybrid electric vehicle, so-called motor-driven actuation of the internal combustion engine may be performed, in which the crankshaft of the internal combustion engine is rotated by the motor, without performing combustion of air-fuel mixture. Thus, in a hybrid electric vehicle, there is a load region of the internal combustion engine in which the load is lower than that in an idling operation state. In this regard, the above-described PCV valve 200 is configured such that the cross-sectional flow area of the flow rate adjuster 218 is maximized when the load on the internal combustion engine 10 is less than or equal to that in an idling operation state. When the PCV valve 200 is employed for the internal combustion engine of a hybrid electric vehicle, the hydrogen concentration in the crankcase 19 can be lowered in a load region in which the load is lower than that in an idling operation state.

The controller is not limited to a device that includes the CPU 110 and the memory 120, and executes software processing. For example, at least part of the processes executed by the software in the above-described embodiment may be executed by hardware circuits dedicated to executing these processes (such as an application-specific integrated circuit (ASIC)). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. One or any desired number of software processing devices that each include a processor and a program storage device and one or any desired number of dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A flow rate control valve configured to adjust a flow rate of blow-by gas drawn into an intake passage from a crankcase of an internal combustion engine that uses hydrogen as fuel, the flow rate control valve comprising:
    a flow rate adjuster that includes a valve member, the flow rate adjuster having a cross-sectional flow area in a section through which the blow-by gas passes and being configured to change the cross-sectional flow area in accordance with movement of the valve member,
    wherein the flow rate control valve is configured such that the cross-sectional flow area is maximized when a load on the internal combustion engine is less than or equal to that in an idling operation state.

2. The flow rate control valve according to claim 1, further comprising:
    an inlet hole configured such that blow-by gas flows into the inlet hole; and
    an outlet hole configured such that blow-by gas flows out from the outlet hole, wherein
    the valve member is columnar and includes a first end and a second end, the second end being on a side opposite to the first end,
    the flow rate adjuster includes a hole configured such that the valve member passes through the hole,
    the first end of the valve member is located closer to the inlet hole than the second end is,
    the second end of the valve member is located closer to the outlet hole than the first end is, and
    a diameter of the first end of the valve member is smaller than a diameter of the second end.

3. The flow rate control valve according to claim 2, wherein a diameter of the valve member is smallest at the first end.

4. The flow rate control valve according to claim 2, wherein the valve member has a tapered shape with a diameter increasing from the inlet hole toward the outlet hole.

5. The flow rate control valve according to claim 1, further comprising an actuator configured to move the valve member,
    wherein the actuator is configured to be controlled to operate such that the cross-sectional flow area is maximized when the load on the internal combustion engine is less than or equal to that in an idling operation state.

* * * * *